(12) United States Patent
Schweikert et al.

(10) Patent No.: US 6,265,661 B1
(45) Date of Patent: Jul. 24, 2001

(54) ALUMINUM ELECTROLYTIC CAPACITOR

(75) Inventors: Wilhelm Schweikert; Rainer Hebel, both of Heidenheim (DE)

(73) Assignee: Epcos AG, München (DE)

( * ) Notice: Subject to any disclaimer, the term of this patent is extended or adjusted under 35 U.S.C. 154(b) by 0 days.

(21) Appl. No.: 09/424,592

(22) PCT Filed: Apr. 28, 1998

(86) PCT No.: PCT/DE98/01174

§ 371 Date: Feb. 24, 2000

§ 102(e) Date: Feb. 24, 2000

(87) PCT Pub. No.: WO98/56051

PCT Pub. Date: Dec. 10, 1998

(30) Foreign Application Priority Data

Jun. 4, 1997 (DE) ............................................. 197 23 455

(51) Int. Cl.⁷ ..................................................... H01R 4/00
(52) U.S. Cl. ............... 174/58; 174/64; 174/135; 248/56; 403/370; 361/517
(58) Field of Search ..................... 174/65 R, 58, 174/135, 52.5, 64; 248/56, 57, 500, 231.9; 403/370, 374.4; 361/517, 535, 536, 537, 518, 519

(56) References Cited

U.S. PATENT DOCUMENTS

| | | |
|---|---|---|
| 3,590,137 * | 6/1971 | Librandi ................................ 220/3.6 |
| 4,296,186 | 10/1981 | Wolf . |
| 4,367,053 | 1/1983 | Stratienko et al. . |
| 4,471,846 | 9/1984 | Mullenberg . |
| 4,557,621 | 12/1985 | Mullenberg . |
| 4,561,796 | 12/1985 | Hanaoka . |
| 5,419,650 * | 5/1995 | Hoshino ............................... 403/370 |
| 5,607,224 * | 3/1997 | Tobias et al. ........................ 362/101 |
| 6,139,215 * | 10/2000 | Kiihne et al. ..................... 403/370 X |

FOREIGN PATENT DOCUMENTS

| | | | |
|---|---|---|---|
| 35 24 278 * | 1/1987 | (DE) ....................................... 248/56 |
| 2 154 062 A | 1/1985 | (GB) . |
| 21 63522A * | 2/1986 | (GB) .................................... 403/370 |

OTHER PUBLICATIONS

Brochure entitled: "Aluminium–Elektrolyt–Kondensatoren", Siemens Matsushita Components, 1997. No month.

* cited by examiner

Primary Examiner—Dean A. Reichard
Assistant Examiner—Dhiru R Patel
(74) Attorney, Agent, or Firm—Schiff Hardin & Waite

(57) ABSTRACT

An aluminum-electrolyte capacitor assembly is provided which includes a capacitor disposed in a metallic housing. The housing is accommodated and held by a ring clamp. The ring clamp is attached to a mounting plate, preferably by screw fasteners. The mounting plate includes a bore for accommodating at least part of the housing. The ring clamp includes a conically shaped extension that extends downward and mateably engages the bore. The assembly may also include a protective ring disposed in the bore and sandwiched between the conically shaped extension of the ring clamp and the mounting plate.

11 Claims, 2 Drawing Sheets

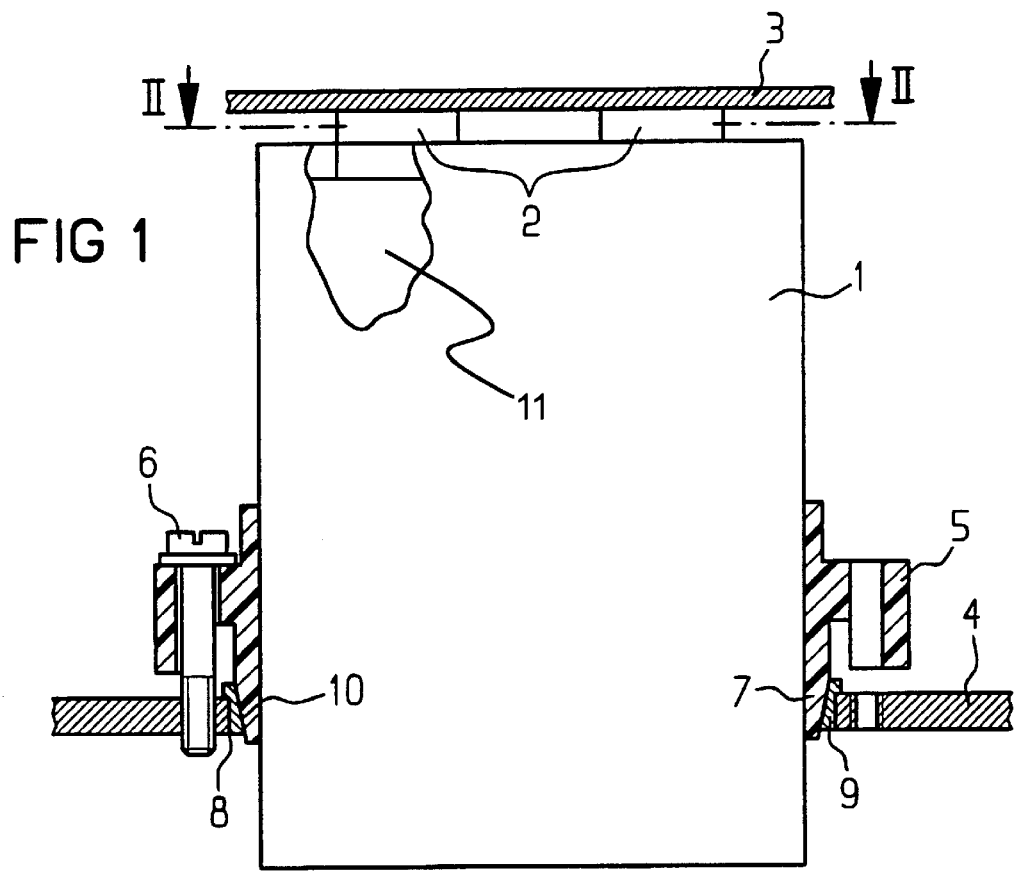
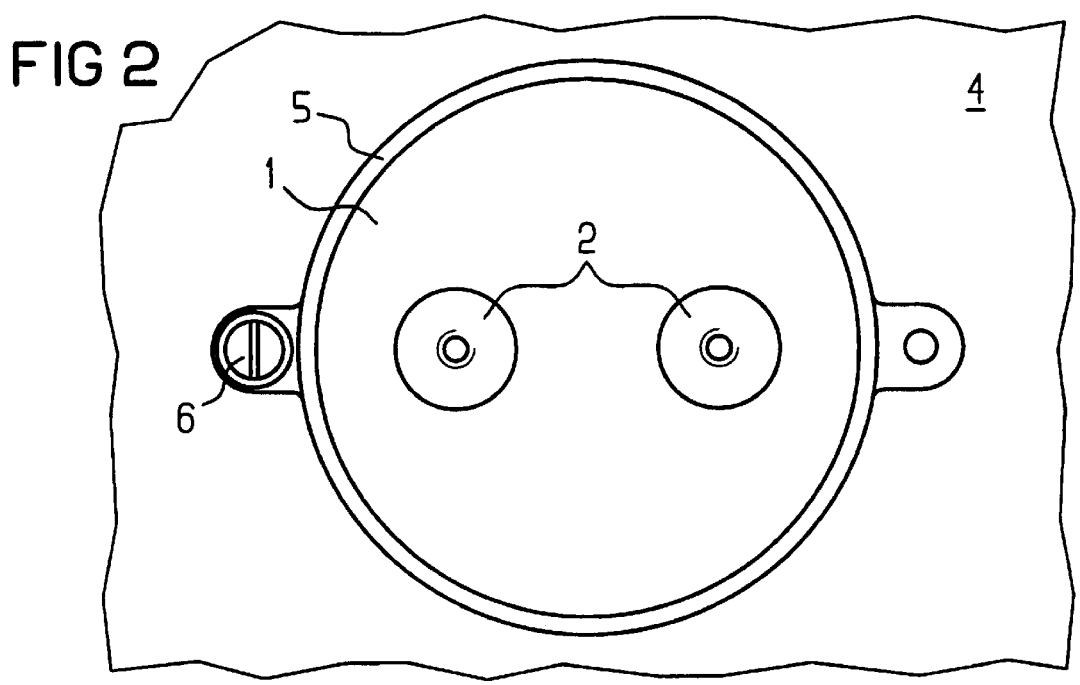

FIG. 3
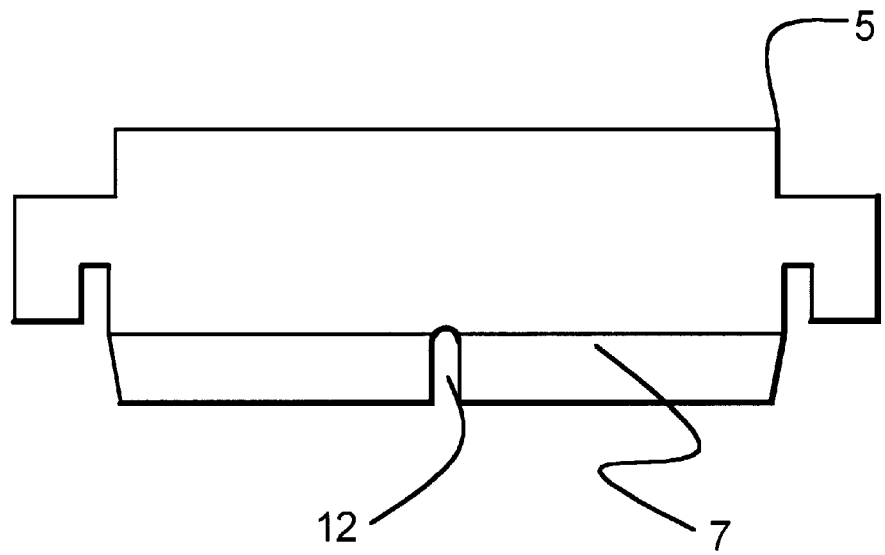
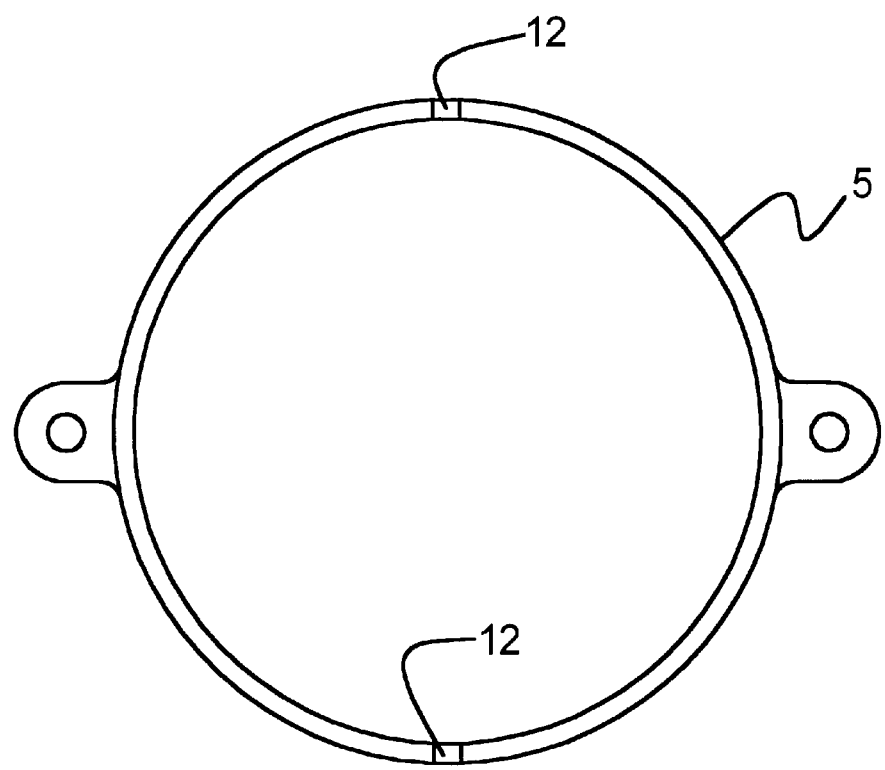
FIG. 4

ALUMINUM ELECTROLYTIC CAPACITOR

FIELD OF THE INVENTION

The invention is directed to an aluminum-electrolyte capacitor, particularly for employment in capacitor batteries, that is installed in a metallic housing, and whereby the housing is held by a ring clamp screwed to a mounting plate.

BACKGROUND OF THE INVENTION

Ring clamp fastenings are known, for example, from the Siemens Matsushita Components Datenbuch 1997, "Aluminum-Electrolyte Capacitors", pages 142 through 145.

Given these known ring clamp fastenings, the housing is fixed in the ring clamp with tension screws and nuts, and the ring clamp itself is then connected to a mounting plate with a screwed connection. Such a fastening of a capacitor to the housing jacket, however, is problematical because the wall thicknesses of the housing jackets are generally very low, and the material is composed of relatively soft aluminum.

SUMMARY OF THE INVENTION

An object of the present invention is to specify an aluminum-electrolyte capacitor of the species initially cited that is secured in mechanically stable fashion on a mounting plate without having significant tension forces acting on the housing.

This object is inventively achieved in that a conically fashioned part is arranged at the ring clamp, said part engaging into a bore attached to the mounting plate.

In an embodiment, the present invention provides an aluminum-electrolyte capacitor assembly that comprises an aluminum-electrolyte capacitor disposed in a metallic housing, the housing being accommodated in and held by a ring clamp, the ring clamp being attached to a mounting plate, the mounting plate comprising a bore for accommodating at least part of the housing, the ring clamp comprising a conically shaped extension that mateably engages the bore.

In an embodiment, the ring clamp is attached to the mounting plate by way of at least on screw.

In an embodiment, the conically shaped extension comprises at least one slot.

In an embodiment, the ring clamp is fabricated from an insulating material.

In an embodiment, the present invention further comprises a protective ring disposed in the bore and sandwiched between conically shaped extension and mounting plate.

In an embodiment, the protective ring is fabricated from plastic.

In an embodiment, the protective ring is conically shaped for receiving the conically shaped extension.

Other objects and advantages of the present invention will become apparent from reading the following detailed description and appended claims, and upon reference to the accompanying drawings.

BRIEF DESCRIPTION OF THE DRAWING

Advantageous developments are the subject matter of subclaims.

The invention is explained in greater detail below with reference to the Drawing, wherein:

FIG. 1 is a side view of a capacitor secured in a mounting plate,

FIG. 2 is a plan view of the capacitor shown in FIG. 1,

FIG. 3 is a side elevational view of the ring clamp, and

FIG. 4 is a bottom plan view of the ring clamp of FIG. 3.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

FIG. 1 shows the housing 1 of an aluminum-electrolyte capacitor 11 that has its terminals 2 secured to a busbar 3. Separate interconnects for the oppositely polled terminals 2, which are not shown, are thereby arranged in the Figure.

The capacitor housing 1 is fixed by a ring clamp 5 that is connected to a mounting plate 4 with screws 6. The ring clamp 5 is composed of an insulating material, for example plastic, and has a conically shaped part 7 that engages into a mounting bore 8 defined by the mounting plate 4.

When screwing the ring clamp 5 to the mounting plate 4, the conical part 7 is pulled into the mounting bore 8. Due to the diminution in the diameter of the cone part 7 that thereby ensues, a fastening that is extremely mechanically stable ensues, whereby the tension forces are introduced directly into the mounting plage 4. Slots 12 (see FIGS. 3 and 4) can Thereby be arranged in the cone part 7 for promoting the diminution in diameter.

What the described embodiment achieves is that the bending stresses that are particularly critical given plastics are considerably reduced in the ring clamp 5 due to this type of mounting, these bending stresses occurring, for example, given vibrating stress of the assembly.

Given metallic mounting plates 4, a protective ring 9 is arranged between conical part 7 and mounting plate 4 in order to avoid notching danger and as a definition of the hole edge, this protective ring 9 being preferably composed of plastic and being conically fashioned at its inside 10.

Given mounting plates 4 of plastic or given a rounded-off hole edge, this protective ring can be omitted.

Diameter tolerances of the capacitor housing 1 can be compensated by the conically fashioned part 7, whereby the range of the tolerance compensation is defined by the angle and the length of the cone. As already described, the conical region 7 of the ring clamp 5 can be interrupted by preferably two through four slots, whereby, of course, more slots can also be arranged.

A further advantage given the fastening of the capacitor housing 1 with a ring clamp 5 of the invention is comprised therein that length tolerances of the capacitor housing 1 can also be compensated, this being particularly important given capacitor batteries.

The clamping forces are thereby primarily absorbed by the mounting plate 4 and not by the ring clamp 5.

FIG. 2 shows a plan view onto the capacitor housing 1 without a busbar. The ring clamp 5 is thereby connected to the mounting plate with two screws 6. Alternatively, the screwed connection can also ensue at more points, for example three or four.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. An aluminum-electrolyte capacitor assembly comprising:

an aluminum-electrolyte capacitor disposed in a metallic housing, the housing being accommodated in and held by a ring clamp, the ring clamp being attached to a mounting plate, the mounting plate comprising a bore for accommodating at least part of the housing, the ring clamp comprising a conically shaped extension that mateably engages the bore.

2. The assembly of claim 1 wherein the ring clamp is attached to the mounting plate by way of at least on screw.

3. The assembly of claim 1 wherein the conically shaped extension comprises at least one slot.

4. The assembly of claim 1 wherein the ring clamp is fabricated from an insulating material.

5. The assembly of claim 1 further comprising a protective ring disposed in the bore and sandwiched between the conically shaped extension and the mounting plate.

6. The assembly of claim 5 wherein the protective ring is fabricated from plastic.

7. The assembly of claim 5 wherein the protective ring is conically shaped for receiving the conically shaped extension.

8. An aluminum-electrolyte capacitor assembly comprising:

an aluminum-electrolyte capacitor disposed in a metallic housing, the housing being accommodated in and held by a ring clamp, the ring clamp being fabricated from an insulating material, the ring clamp being attached to a mounting plate with at least one screw, the mounting plate comprising a bore for accommodating at least part of the housing, the ring clamp comprising a conically shaped extension that mateably engages the bore, the assembly further comprising a protective ring disposed in the bore and sandwiched between the ring clamp and the mounting plate.

9. The assembly of claim 8 wherein the conically shaped extension comprises at least one slot.

10. The assembly of claim 8 wherein the protective ring is fabricated from plastic.

11. The assembly of claim 10 wherein the protective ring is conically shaped for receiving the conically shaped extension.

\* \* \* \* \*